US008527862B2

(12) United States Patent
Scoda et al.

(10) Patent No.: US 8,527,862 B2
(45) Date of Patent: Sep. 3, 2013

(54) METHODS FOR MAKING AJAX WEB APPLICATIONS BOOKMARKABLE AND CRAWLABLE AND DEVICES THEREOF

(75) Inventors: Enrico Scoda, Martignacco (IT); Simone Pezzano, Udine (IT)

(73) Assignee: Usablenet Inc., New York, NY (US)

( * ) Notice: Subject to any disclaimer, the term of this patent is extended or adjusted under 35 U.S.C. 154(b) by 138 days.

(21) Appl. No.: 13/135,112

(22) Filed: Jun. 24, 2011

(65) Prior Publication Data
US 2012/0331372 A1 Dec. 27, 2012

(51) Int. Cl.
*G06F 17/00* (2006.01)
(52) U.S. Cl.
USPC .......................................................... 715/206
(58) Field of Classification Search
USPC .......................................................... 715/206
See application file for complete search history.

(56) References Cited

U.S. PATENT DOCUMENTS

| 8,307,099 | B1* | 11/2012 | Khanna et al. | 709/229 |
|---|---|---|---|---|
| 2006/0112174 | A1* | 5/2006 | L'Heureux et al. | 709/223 |
| 2006/0190561 | A1* | 8/2006 | Conboy et al. | 709/217 |
| 2008/0177883 | A1* | 7/2008 | Hanai et al. | 709/227 |
| 2008/0282175 | A1* | 11/2008 | Costin et al. | 715/760 |
| 2008/0313206 | A1* | 12/2008 | Kordun et al. | 707/102 |
| 2009/0015599 | A1* | 1/2009 | Bennett et al. | 345/680 |
| 2009/0070392 | A1* | 3/2009 | Le Roy et al. | 707/203 |
| 2009/0119675 | A1* | 5/2009 | Higgins et al. | 719/311 |
| 2009/0282052 | A1 | 11/2009 | Evans et al. | |
| 2011/0066609 | A1* | 3/2011 | Ashkenazi et al. | 707/709 |
| 2012/0011431 | A1* | 1/2012 | Mao | 715/234 |
| 2012/0131428 | A1* | 5/2012 | Tsai et al. | 715/205 |
| 2012/0136764 | A1* | 5/2012 | Miller et al. | 705/31 |
| 2012/0191840 | A1* | 7/2012 | Gordon | 709/223 |
| 2012/0323881 | A1* | 12/2012 | Liu et al. | 707/709 |

FOREIGN PATENT DOCUMENTS

| WO | 2009076187 A2 | 6/2009 |
|---|---|---|
| WO | 2011035944 A1 | 3/2011 |

OTHER PUBLICATIONS

Duda et al., Ajax Crawl: Making Ajax Applications Searchable, IEEE, IEEE International Conference on Data Engineering 09, 2009, p. 78-89.*
Duda et al., Ajaxsearch: Crawling, Indexing, and Searching Web 2.0 Applications, ACM, PVLDB '08, Aug. 23-28, 2008, p. 1440-1443.*
Mesbah et al., Crawling Ajax by Inferring User Interface State Changes, IEEE, Eighth International Conference on Web Engineering, 2008, p. 122-134.*
International Search Report for International Patent Application No. PCT/US2012/044012 (Dec. 21, 2012).

* cited by examiner

*Primary Examiner* — Frank D Mills
(74) *Attorney, Agent, or Firm* — LeClairRyan, a Professional Corporation

(57) ABSTRACT

Methods, devices, and computer-readable storage media that make an asynchronous JavaScript and extensible mark-up language (AJAX) application content state bookmarkable and crawlable include receiving a HyperText Transfer Protocol (HTTP) request is received. The HTTP request includes an HTTP request uniform resource locator (URL) representing a current application state. When the HTTP request URL contains a first reference substring, a second substring is extracted from the HTTP request URL based upon the first reference substring. A modified URL is generated based at least in part on the extracted second substring. The modified URL represents the current application content state.

18 Claims, 2 Drawing Sheets

METHODS FOR MAKING AJAX WEB APPLICATIONS BOOKMARKABLE AND CRAWLABLE AND DEVICES THEREOF

FIELD

This technology generally relates to methods for processing web application content and, more particularly, to methods for making an asynchronous JavaScript and extensible mark-up language (AJAX) application content state bookmarkable and crawlable and devices thereof.

BACKGROUND

An asynchronous JavaScript and extensible mark-up language (AJAX) web application uses AJAX to communicate with a server to load data or page fragments. Programming with AJAX offers benefits in the context of web application development. For example, AJAX offers site developers an additional level of innovation that may make a site easier to use for all visitors. AJAX may also be utilized to give users the sense that a web application is more responsive than a traditional web site.

However, with the use of AJAX to manipulate web page content, an issue arises with regard to providing bookmarkability of content that may be dynamic rather than static during a user session. For example, while a web page may have a single non-changing uniform resource locator (URL) stored in the web browser, the content in many AJAX web sites is asynchronously changed and replaced. Accordingly, when a user sets a bookmark, he may only be able to capture the starting URL of the web site instead of the exact content state he is currently viewing. Users therefore will want a way to bookmark a dynamic web page in a way that allows them to restore a specific content state.

One common solution is to change the hash part of the URL, since doing so does not activate any actions, such as loading a new page on the browser side. However, this approach yields yet another issue as to how a web crawler or web robot can access that URL. Even if the hash part of the URL contains all of the information needed to fetch correct data using AJAX technology, the web crawler will not be able to access it since web crawlers are not able to execute JavaScript code inside the web pages they download.

SUMMARY

An exemplary method for making an asynchronous JavaScript and extensible mark-up language (AJAX) application content state bookmarkable and crawlable includes receiving at a web application processing server device a HyperText Transfer Protocol (HTTP) request including an HTTP request uniform resource locator (URL) representing a current application content state. When the HTTP request URL contains a first reference substring, a second substring based upon the first reference substring is extracted from the HTTP request URL with the web application processing server device. Based at least in part on the extracted second substring, a modified URL representing the current application content state is generated by the web application processing server device.

An exemplary computer-readable storage medium having stored thereon instructions for making an AJAX application content state bookmarkable and crawlable. The instructions include machine executable code which, when executed by at least one processor, causes the processor to perform steps including receiving a HTTP request including an HTTP request uniform resource locator (URL) representing a current application content state. When the HTTP request URL contains a first reference substring, a second substring based upon the first reference substring is extracted from the HTTP request URL. Based at least in part on the extracted second substring, a modified URL representing the current application content state is generated.

An exemplary web application processing server device including one or more processors and a memory coupled to the one or more processors which are configured to execute programmed instructions stored in the memory, the programmed instructions including receiving a HTTP request including an HTTP request uniform resource locator (URL) representing a current application content state. When the HTTP request URL contains a first reference substring, a second substring based upon the first reference substring is extracted from the HTTP request URL. Based at least in part on the extracted second substring, a modified URL representing the current application content state is generated.

This technology provides effective and efficient methods and devices for creating a concise URL representing a specific AJAX web application page or content state, which thereby allows generic web crawlers or robots to index the page or content state thus represented.

DETAILED DESCRIPTION

Figure 1:
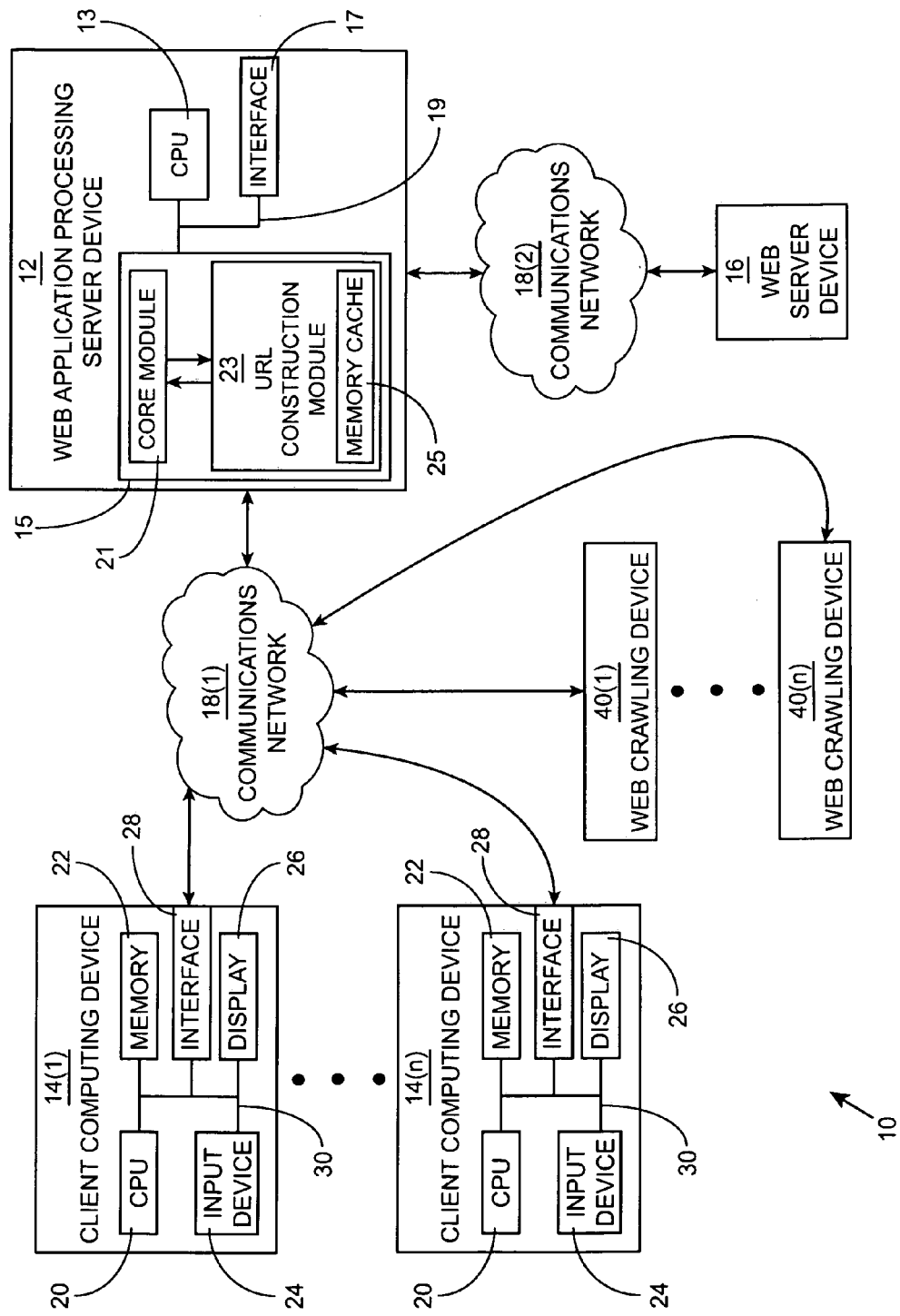
FIG. 1 is a block diagram of a network environment with an exemplary web application processing server device.

A network environment 10 with an exemplary web application processing server device 12 is illustrated in FIG. 1. The environment 10 may include the web application processing server device 12, client computing devices 14(1)-14(n), web crawling devices 40(1)-40(n), a web server device 16, and communication networks 18(1)-18(2), although other numbers and types of systems, devices, servers, and/or elements in other configurations can be used. This technology provides effective and efficient methods and devices for creating a concise URL representing a specific AJAX web application page or content state, which thereby allows generic web crawlers or robots to index the page or content state thus represented.

This technology is directed to methods, devices, and computer-readable storage media for making an asynchronous JavaScript and extensible mark-up language (AJAX) application content state bookmarkable and crawlable. In this example, the web application processing server device 12 receives a HyperText Transfer Protocol (HTTP) request including an HTTP request uniform resource locator (URL) representing a current application content state; extracts, from the HTTP request URL, a second substring based upon a first reference substring, when the HTTP request URL contains the first reference substring; and generates a modified URL based at least in part on the extracted second substring, wherein the modified URL represents the current application content state. Although one web application processing server device 12 is shown, other numbers and types of web application processing server systems can be used.

In some examples, the web application processing server device 12 may be a web content proxy server, or any other type of proxy server. For example, the web application processing server device 12 may manage the handling of redirect messages or redirection responses from the one or more web server devices 16 for and/or on behalf of requesting client devices 14(1)-14(n) and/or requesting web crawling devices 40(1)-40(n), although the web application processing server device 12 may provide other numbers and types of functions.

In other examples, the web application processing server device 12 may itself be a web server device. For example, the web application processing server device 12 may be contained in or identical to web server device 16. In such examples, the web application processing server device 12 may host one or more AJAX web applications and store associated web content in memory 15.

Referring more specifically to FIG. 1, the web application processing server device 12 may include a central processing unit (CPU) or processor 13, a memory 15, and an interface system 17 which are coupled together by a bus 19 or other link, although other numbers and types of components, parts, devices, systems, and elements in other configurations and locations can be used. The processor 13 in the web application processing server device 12 may execute a program of stored instructions one or more aspects of the present technology as described and illustrated by way of the examples herein, including methods for making an asynchronous AJAX application content state bookmarkable and crawlable, although the processor could execute other numbers and types of programmed instructions.

The memory 15 in the web application processing server device 12 may store these programmed instructions for one or more aspects of the present technology as described and illustrated herein, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to the processor 13, may be used for the memory 15 in the web application processing server device 12. In some of these examples, the memory 15 may include a core module 21, a URL construction module 23, and a memory cache 25 which may store programmed instructions for one or more aspects of the present technology as described and illustrated herein, although the memory may comprise other types and numbers of systems, devices, and elements in other configurations which may store other data.

The interface device 17 in the web application processing server device 12 may be used to operatively couple and communicate between the web application processing server device 12 and the client computing devices 14(1)-14(n), web crawling devices 40(1)-40(n), and the web server device 16 via the communication networks 18(1) and 18(2), although other types and numbers of communication networks with other types and numbers of connections and configurations can be used. By way of example only, the communication networks 18(1) and 18(2) may use TCP/IP over Ethernet and industry-standard protocols, including HTTP, HTTPS, WAP, and SOAP, although other types and numbers of communication networks, such as a direct connection, a local area network, a wide area network, modems and phone lines, e-mail, and wireless and hardwire communication technology, each having their own communications protocols, may be used.

Each of the client computing devices 14(1)-14(n) may enable a user to access content and utilize one or more applications from the web server device 16 through the web application processing server device 12 through one or more communication networks, although one or more of the client computing devices 14(1)-14(n) could access content and utilize other types and numbers of applications from other sources and could provide a wide variety of other functions for the user. Although multiple client computing devices 14(1)-14(n) are shown, other numbers and types of user computing systems could be used. In this example, the client computing devices 14(1)-14(n) comprise devices with Internet access that permit a website page or other retrieved data to be displayed.

By way of example only, one or more of the client computing devices 14(1)-14(n) may comprise smart phones, personal digital assistants, or desktop computers using visual or voice browsers.

Each of client computing devices 14(1)-14(n) may include a central processing unit (CPU) or processor 20, a memory 22, user input device 24, a display 26, and an interface system 28, and which are coupled together by a bus 30 or other link, although one or more of client computing devices 14(1)-14(n) may include other numbers and types of components, parts, devices, systems, and elements in other configurations. The processor 20 in each of client computing devices 14(1)-14(n) may execute a program of stored instructions for one or more aspects of the present technology as described and illustrated herein, although the processor could execute other numbers and types of programmed instructions.

The memory 22 in each of the client computing devices 14(1)-14(n) may store these programmed instructions for one or more aspects of the present technology as described and illustrated herein, although some or all of the programmed instructions could be stored and/or executed elsewhere. A variety of different types of memory storage devices, such as a random access memory (RAM) or a read only memory (ROM) in the system or a floppy disk, hard disk, CD ROM, or other computer readable medium which is read from and/or written to by a magnetic, optical, or other reading and/or writing system that is coupled to processor 20 may be used for the memory 22 in each of the client computing devices 14(1)-14(n).

The user input device 24 in each of the client computing devices 14(1)-14(n) may be used to input selections, such as requests for a particular website page, although the user input device could be used to input other types of data and interact with other elements. The user input device may include keypads, touch screens, and/or vocal input processing systems although other types and numbers of user input devices can be used.

The display 26 in each of the client computing devices 14(1)-14(n) may be used to show data and information to the user, such as a website page by way of example only. The display in each of the client computing devices 14(1)-14(n) may be a phone screen display, although other types and numbers of displays could be used.

The interface system 28 in each of the client computing devices 14(1)-14(n) may be used to operatively couple and communicate between the client computing devices 14(1)-14(n) and the web application processing server device 12 and web server device 16 over the communication networks 18(1) and 18(2), although other types and numbers of communication networks with other types and numbers of connections and configurations may be used.

The web server device 16 may provide one or more web software applications for use by one or more of the client computing devices 14(1)-14(n), although the web server device 16 can provide other numbers and types of applications and/or content and can have provide other numbers and types of functions. Although one web server device 16 is shown for ease of illustration and discussion, other numbers and types of web server systems and devices can be used.

The web server device 16 may include a central processing unit (CPU) or processor, a memory, and an interface system which are coupled together by a bus or other link, although the web server device 16 may have other numbers and types of components, parts, devices, systems, and elements in other configurations and locations may be used. The processor in the web server device 16 may execute a program of stored instructions for one or more aspects of the present technology as described and illustrated by way of the examples herein, including managing application functionality, although the processor could execute other numbers and types of programmed instructions.

The memory in the web server device 16 may store these programmed instructions for one or more aspects of the present technology as described and illustrated by way of the examples herein including managing application functionality, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to the processor, may be used for the memory in each of the web server device 16.

The interface system in the web server device 16 may be used to operatively couple and communicate between the web server device 16 and the web application processing server device 12, the client computing devices 14(1)-14(n), and web crawling devices 40(1)-40(n) via communication networks 18(1) and 18(2), although other types and numbers of communication networks with other types and numbers of connections and configurations can be used.

Although examples of the web application processing server device 12, the client computing devices 14(1)-14(n), web crawling devices 40(1)-40(n), and the web server device 16, are described and illustrated herein, each of the client computing devices 14(1)-14(n), web crawling devices 40(1)-40(n), the web application processing server device 12, and the web server device 16, may be implemented on any suitable computer system or computing device. It is to be understood that the devices and systems of the examples described herein are for exemplary purposes, as many variations of the specific hardware and software used to implement the examples are possible, as will be appreciated by those skilled in the relevant art(s).

Furthermore, each of the systems of the examples may be conveniently implemented using one or more general purpose computer systems, microprocessors, digital signal processors, and micro-controllers, programmed according to the teachings of the examples, as described and illustrated herein, and as will be appreciated by those ordinary skill in the art.

In addition, two or more computing systems or devices can be substituted for any one of the systems in any embodiment of the examples. Accordingly, principles and advantages of distributed processing, such as redundancy and replication also can be implemented, as desired, to increase the robustness and performance of the devices and systems of the examples. The examples may also be implemented on computer system or systems that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, and combinations thereof The examples may also be embodied as a computer readable medium having instructions stored thereon for one or more aspects of the present technology as described and illustrated by way of the examples herein, as described herein, which when executed by a processor, cause the processor to carry out the steps necessary to implement the methods of the examples, as described and illustrated herein.

Figure 2:
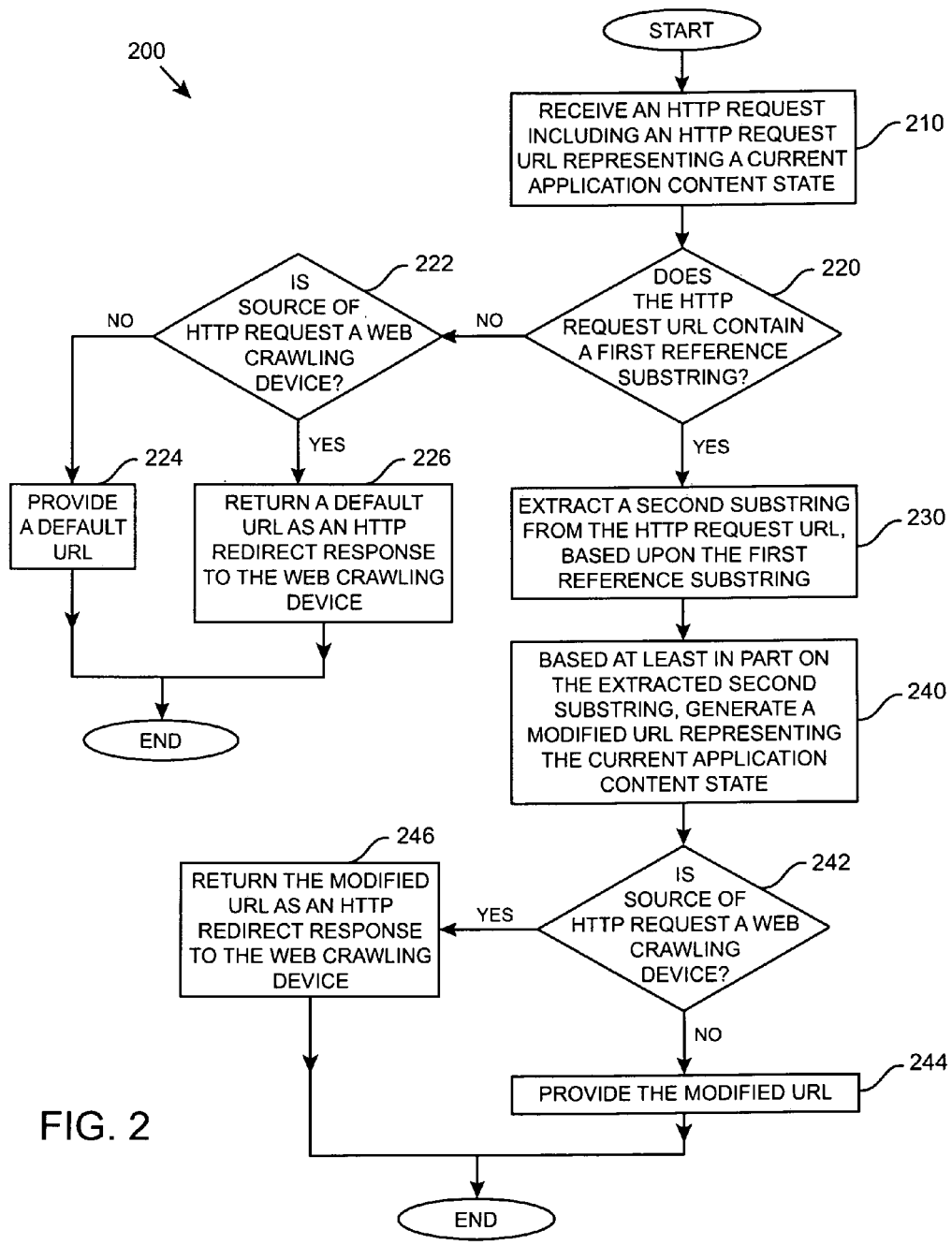
FIG. 2 is a flowchart of an exemplary method for making an AJAX application content state bookmarkable and crawlable.

Referring to FIGS. 1-2, an exemplary method 200 for making an AJAX application content state bookmarkable and crawlable will now be described. In step 210, the web application processing server device 12 receives an HTTP request which includes an HTTP request URL representing a current application content state. In other examples, such as where the HTTP request originated from a client computing device 14, the HTTP request URL may correspond to a bookmark.

In step 220, the web application processing server device 12 determines whether the HTTP request contains a first reference substring. If in step 220 the HTTP request URL contains the first reference substring in step 220, then the Yes branch is taken to step 230.

In step 230, the web application processing server device 12 extracts a second substring from the HTTP request URL based upon the first reference substring. In some examples, the second substring may follow the first reference substring. In some of these examples, the second substring may include all of the text immediately following the first reference substring.

In step 240, the web application processing server device 12 generates a modified URL representing the current application content state based at least in part on the extracted second substring. The modified URL may, for example, be generated by the URL construction module 23 of the web application processing server device 12.

In step 242, the web application processing server device 12 determines if the source of the HTTP request is one of the web crawling device 40(1)-40(n) based upon a header in the HTTP request, although other manners for determining an identity of the source can be used. If in step 242 the web application processing server device 12 determines the source of the HTTP request is not one of the web crawling device 40(1)-40(n), then the No branch is taken to step 244. In step 244, the web application processing server device 12 provides the modified URL to the appropriate web server device 16. Based on the modified URL, the web server device 16 generates a response to the HTTP request which is then communicated to the source of the request (e.g., one of the client computing devices 14(1)-14(n)), and then the method ends. In some embodiments, the response generated by the web server device 16 may include the current application content state corresponding to the modified URL.

If in step 242 the web application processing server device 12 determines the source of the HTTP request is one of the web crawling devices 40(1)-40(n), then the Yes branch is taken to step 246. In step 246, the web application processing server device 12 returns the modified URL as an HTTP redirect response to the identified one of the one of the web crawling device 40(1)-40(n). The web application processing server device 12 also may store the default URL at a location (e.g., in memory 15) associated with the HTTP redirect response. After step 246, this method ends.

If back in step 220, the received HTTP request URL does not contain the first reference substring in step 220, then the No branch is taken to step 222.

In step 222, the web application processing server device 12 determines based upon a header in the HTTP request if the source of the HTTP request is one of the web crawling devices 40(1)-40(n), although other manners for determining the source can be used. If in step 222 the web application processing server device 12 determines the source of the HTTP request is not one of the web crawling devices 40(1)-40(n), then the No branch is taken to step 224. In step 224, the web application processing server device 12 provides a default URL to the appropriate web server device 16. Based on the default URL, the web server device 16 generates a response to the HTTP request which is then communicated to the requesting one of the client computing devices 14(1)-14(n), and then the method ends, although other types of devices and systems could be the source of the request. In some embodiments, the response generated by the web server device 16 may include the current application content state corresponding to the default URL.

If in step 222 the web application processing server device 12 determines the source of the HTTP request is one of the web crawling devices 40(1)-40(n), then the Yes branch is taken to step 226. In step 226, the web application processing server device 12 returns the default URL as an HTTP redirect response to the identified one of the web crawling devices 40(1)-40(n) that was the source of the HTTP request. The web application processing server device 12 also may store the default URL at a location (e.g., in memory 15) associated with the HTTP redirect response. After step 226 this method ends.

In an embodiment utilizing the exemplary method 200, a web application located at www.example.com/index.html may load the fragment welcome.html when starting up. This web application may also load product description pages identified by such links as /products/pdp.jsp?id=2234. The exemplary method 200 also may be utilized to address the problem of creating a URL representing an AJAX web application page or content state. One concept associated with exemplary method 200 is that relevant web pages (e.g., pages whose URLs will likely be saved or shared) may be a small portion of the entire web application. Moreover, such relevant web pages may often be identified by a small set of identifiers corresponding to keys in catalog databases or specific events (e.g., dates, flight numbers, etc.). For example, the URL /products/pdp.jsp?id=2234 may be represented by the identifier "2234". Therefore, in some examples, the AJAX web application JavaScript code may contain a function that creates a mapping between such an identifier and its corresponding URL. In some of these examples, a standard filename may be established for the portion of the JavaScript code containing this mapping function. The resulting JavaScript file containing this function may be limited to this mapping function and its dependencies (e.g., data structures or utility functions). Thus, a simple implementation of the JavaScript interpreter may be hosted on the web application processing server device 12, and the mapping function may be executed to obtain the URL being used by the web application AJAX engine. For example, in step 240, URL construction module 23 of web application processing server device 12 may, upon receiving such an identifier or second substring as an input (e.g., "2234"), generate the corresponding modified or processed URL associated with that identifier.

In another embodiment utilizing the exemplary method 200, an HTTP request URL may contain the first reference substring "/shareCode-" in step 220. In some of these examples, the substring following "/shareCode-" may be extracted in step 230 and passed along to the URL construction module 23 of the web application processing server device 12. In step 240, URL construction module 23 may then map this extracted second substring or identifier to a corresponding modified URL representing the current application content state. If, on the other hand, the HTTP request URL does not contain the first reference substring "/shareCode-" in step 220, then a default URL (e.g., a default startup URL) may be provided to the source of the HTTP request, as described in step 224 or step 226.

For example, consider an embodiment in which the HTTP request URL contains the path "/shareCode-2234". In step 230, the web application processing server device 12 extracts the identifier or second substring "2234" and passes it to the URL construction module 23, which returns the URL "/products/pdp.jsp?id=2234" in step 240. If, on the other hand, the URL path is equal to "/index.html", a default URL (e.g., "/welcome.html") may be returned in step 224 or step 226.

Beneficially, this approach results in short and concise URLs representing web application pages. Moreover, relevant data is in the URL path component such that it is universally recognized as a URL portion to keep. (Some web crawler devices, for example, will remove the hash portion of the URL when indexing.) Additionally, since only key information from the URL used by the AJAX call is used in the URL representing the web application content state, any marginal changes to the AJAX call URL will not invalidate the web application URL being saved, shared, or indexed.

In another embodiment utilizing exemplary method 200, one of the web crawling devices 40(1)-40(n) may send an HTTP request to the web application processing server device 12. The web application processing server device 12 may recognize that the HTTP request originated from one of the web crawling devices 40(1)-40(n) by analyzing a header (e.g., the User-Agent HTTP request header) in the HTTP request. In some examples, if the header value is included in a list of supported or recognized web crawling devices, exemplary method 200 will be executed.

In some of these examples, if, in step 220, the HTTP request URL does not contain the first reference substring (e.g., "/shareCode-"), the web application processing server device 12 may provide to the one of the web crawling devices 40(1)-40(n) an HTTP redirect response containing the web application main HTML file (or any other suitable default URL) as content in step 226.

Otherwise, if the HTTP request URL does contain the first reference substring (e.g., "/shareCode-") in step 220, then, in some examples, the substring following "/shareCode-" may be extracted in step 230 and passed to the URL construction module 23. In steps 240, 242, and 246, the URL construction module 23 may generate and return the corresponding modified URL as an HTTP redirect response to one of the web crawling devices 40(1)-40(n). In this way, the one of the web crawling devices 40(1)-40(n) may access the URL of the HTML page containing the relevant information to be indexed.

Beneficially, this approach allows any of the web crawling devices 40(1)-40(n) to access AJAX web application pages or content states without a need to execute JavaScript code to emulate the AJAX web application behavior.

Additionally, there is no need to add new standards or protocols to instruct web server devices and/or web crawling devices how to share information about AJAX web application pages.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for making an asynchronous JavaScript and extensible mark-up language (AJAX) application content state bookmarkable and crawlable, the method comprising:
   receiving at a web application processing server device a HyperText Transfer Protocol (HTTP) request comprising an HTTP request uniform resource locator (URL) representing a current application content state;
   extracting from the HTTP request URL with the web application processing server device a second substring based upon a first reference substring, when the HTTP request URL contains the first reference substring;
   generating by the web application processing server device a modified URL based at least in part on the extracted second substring, the modified URL representing the current application content state;
   identifying with the web application processing server device when the HTTP request is from a web crawler based upon a header in the HTTP request; and
   returning with the web application processing server device the modified URL as an HTTP redirect response to the web crawler when the HTTP request is identified as being from the web crawler.

2. The method as set forth in claim 1 further comprising: providing with the web application processing server device a default URL when the HTTP request URL does not contain the first reference substring.

3. The method as set forth in claim 1 further comprising: providing by the web application processing server device the modified URL.

4. The method as set forth in claim 1 wherein the second substring follows the first reference substring.

5. The method as set forth in claim 1 wherein the HTTP request URL corresponds to a bookmark.

6. The method as set forth in claim 1 further comprising: storing by the web application processing server device the modified URL at a location associated with the HTTP redirect response.

7. A non-transitory computer readable medium having stored thereon instructions for making an asynchronous JavaScript and extensible mark-up language (AJAX) application content state bookmarkable or crawlable comprising machine executable code which when executed by at least one processor, causes the processor to perform steps comprising:
   receiving a HyperText Transfer Protocol (HTTP) request comprising an HTTP request uniform resource locator (URL) representing a current application content state;
   extracting, from the HTTP request URL, a second substring based upon a first reference substring, when the HTTP request URL contains the first reference substring;
   generating a modified URL based at least in part on the extracted second substring, the modified URL representing the current application content state;
   identifying when the HTTP request is from a web crawler, based upon a header in the HTTP request; and
   returning the modified URL as an HTTP redirect response to the web crawler when the HTTP request is identified as being from the web crawler.

8. The medium as set forth in claim 7 further comprising: providing a default URL when the HTTP request URL does not contain the first reference substring.

9. The medium as set forth in claim 7 further comprising: providing the modified URL.

10. The medium as set forth in claim 7 wherein the second substring follows the first reference substring.

11. The medium as set forth in claim 7 wherein the HTTP request URL corresponds to a bookmark.

12. The medium as set forth in claim 7 further comprising: storing the modified URL at a location associated with the HTTP redirect response.

13. A web application processing server device for making an asynchronous JavaScript and extensible mark-up language (AJAX) application content state bookmarkable and crawlable, the device comprising:
   one or more processors;
   a memory coupled to the one or more processors which are configured to execute programmed instructions stored in the memory, the programmed instructions comprising:
      receiving a HyperText Transfer Protocol (HTTP) request comprising an HTTP request uniform resource locator (URL) representing a current application content state;
      extracting, from the HTTP request URL, a second substring based upon a first reference substring, when the HTTP request URL contains the first reference substring;
      generating a modified URL based at least in part on the extracted second substring, the modified URL representing the current application content state;
      identifying when the HTTP request is from a web crawler, based upon a header in the HTTP request; and
      returning the modified URL as an HTTP redirect response to the web crawler when the HTTP request is identified as being from the web crawler.

14. The device as set forth in claim 13 further comprising: providing a default URL when the HTTP request URL does not contain the first reference substring.

15. The device as set forth in claim 13 further comprising: providing the modified URL.

16. The device as set forth in claim 13 wherein the second substring follows the first reference substring.

17. The device as set forth in claim 13 wherein the HTTP request URL corresponds to a bookmark.

18. The device as set forth in claim 13 further comprising: storing the modified URL at a location associated with the HTTP redirect response.

* * * * *